United States Patent Office 3,167,527
Patented Jan. 26, 1965

3,167,527
HALOGEN-CONTAINING RESINS STABILIZED WITH A TIN COMPOUND AND A LIQUID POLYTHIOPOLYMERCAPTAN
Ingenuin Hechenbleikner, Cincinnati, and Robert E. Bresser, Sharonville, Ohio, assignors to Carlisle Chemical Works, Inc., Reading, Ohio, a corporation of Ohio
No Drawing. Filed Jan. 26, 1961, Ser. No. 84,998
14 Claims. (Cl. 260—45.75)

The present invention relates to the preparation of halogen containing resins containing tin compounds as stabilizers therefor.

It is an object of the present invention to extend the heat and light stability of halogen containing resins.

Another object is to provide novel stabilized vinyl resin compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing a mixture of a tin stabilizer and a nontin containing sulfur compound from the group of (1) a liquid polythiopolymercaptan and (2) alkylene glycol and polyethylene glycol derivatives of 3-mercaptopropionic acid, mercaptoacetic acid or 4-mercaptobutyric acid as heat and light stabilizers for halogen containing resins. It has been found that the use of the mixture of tin compound and nontin containing sulfur compound exerts a synergistic stabilizing action which could not be foretold from the use of either of these alone.

In the specification and claims all parts and percentages are by weight unless otherwise indicated.

The stabilizers of the present invention can be used with halogen containing vinyl and vinylidene resins in which the halogen is attached directly to the carbon atoms. Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% of polymerized vinyl chloride.

As the chlorinated resin there can be employed chlorinated polyethylene having 14 to 75%, e.g., 27%, chlorine by weight, polyvinyl chloride, polyvinylidene chloride, polyvinyl bromide, polyvinyl fluoride, copolymers of vinyl chloride with 1 to 90%, preferably 1 to 30%, of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha chloroacrylate, styrene, trichloroethylene, vinyl ethers such as vinyl ethyl ether, vinyl chloroethyl ether and vinyl phenyl ether, vinyl ketones such as vinyl methyl ketone and vinyl phenyl ketone, 1-fluoro-1-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinylacetate (87:13), vinyl chloride-vinyl acetate-maleic anhydride (86:13:1), vinyl chloride-vinylidene chloride (95:5), vinyl chloride-diethyl fumarate (95:5), vinyl chloride-trichloroethylene (95:5), vinyl chloride-2-ethylhexyl acrylate (80:20).

The mixture of stabilizers of the present invention can be incorporated with the resin by admixing in an appropriate mill or mixer or by any of the other well known methods which provide for uniform distribution throughout the resin compositions. Thus, mixing can be accomplished by milling on rolls at 100–160° C.

In addition to the novel mixture of stabilizers there can also be incorporated with the resin conventional additives such as plasticizers, pigments, fillers, dyes, ultraviolet light absorbing agents, densifying agents and the like.

If a plasticizer is employed, it is used in conventional amount, e.g., 30 to 150 parts per 100 parts of resin. Typical plasticizers are di-2-ethylhexyl phthalate, dibutyl sebacate, dioctyl sebacate, tricresyl phosphate.

The tin compound in the stabilizer mixture is normally used in an amount of 0.01 to 10% by weight of the resin and the sulfur compound also is normally used in an amount of 0.01 to 10% by weight of the resin. More preferably, 0.2 to 5% of the tin compound and 0.2 to 5% of the sulfur compound are employed based on the weight of the resin.

As the tin compound there can be employed any tin stabilizers for halogen containing resins. Typical examples of such compounds have the formulae $RSnX_3$, $R_2SnX_2$ and $R_3SnX$ where R is a univalent organic radical such as alkyl, aryl, aralkyl or substituted derivatives and X is —OR, RCOO—, ROOCR'COO—, —SR, —OOCR'SH or ROOCR'S— wherein R is as defined above and R' is a divalent organic radical, usually alkylene. The various R groups can be the same or different. In addition, two X's together can be a divalent radical such as —OOCR'COO—.

Furthermore, there can be employed compounds such as $R_2SnO$ and $R_2SnS$.

Illustrative examples of tin compounds which can be employed include dibutyl tin dibutoxide, dibutyl tin dilaurate, dibutyl tin bis butylazealate, dibutyl tin dioctyl mercaptide, 2,2 - dioctyl - 1-oxa-2-stanna-3-thiocyclopentane-5-one, dibutyl tin bis butylmercaptoacetate, dibutyl tin bis monobutyladipate, dioctyl tin bis isooctylmercaptoacetate, dioctyl tin oxide, dibutyl tin sulfide, diphenyl tin oxide, dibenzyl tin oxide, dilauryl tin oxide, methyl phenyl tin oxide, butyl stannoic acid, dioctyl tin sulfide, 2,2-dibutyl-1-oxa-2-stanna-3-thiocyclopentane - 5 - one, dioctyl tin dibutoxide, dioctyl tin dioctoxide, butyl tin tributoxide, dimethyl tin dicoconut mercaptide, dibutyl tin distearyl mercaptide, butyl tin tridodecyl mercaptide, diethyl tin dicresyl mercaptide, octyl tin triphenyl mercaptide, phenyl tin tributyl mercaptide, trioctyl tin butoxide, trimethyl tin octoxide, triphenyl tin butoxide, methyl tin tricoconut mercaptide, dibutyl tin dithioglycolic acid cyclohexyl ester, monobutyl tin trithiopropionic acid hexyl ester, triphenyl tin thioglycolic acid benzyl ester, dilauryl tin dithiobutyric acid amyl ester, dipropyl tin dithiovaleric acid tetrahydrofurfuryl ester, butyl tin tris (mercaptoacetic acid), dibutyl tin S,S' bis (dibutyl thiomalate), dibutyl tin S,S' bis (thiomalic acid), and dibutyl tin maleate.

These tin compounds have the characteristic of being acceptors for hydrogen chloride and hence act as stabilizers.

As the synergistic nontin containing sulfur compound there can be employed polythiopolymercaptans having a molecular weight of 250 or preferably 500 to 12,000, and existing at 25° C. as a liquid. These materials are available commercially as various forms of liquid Thiokol. Their method of preparation is described in Patrick Patent 2,466,963. Any of the liquid polythiopolymercaptans described in the Patrick patent can be employed and the entire disclosure of that patent is hereby incorporated by reference.

A preferred liquid Thiokol is Thiokol LP-8 which is essentially a liquid polythiodithiol having a molecular weight of 500-700 and prepared, for example, by reacting sodium disulfide with a mixture of 98 mol percent of bis (2-chlorethyl) formal and 2 mol percent of trichloropropane. The structure of LP-8 may be represented basically as

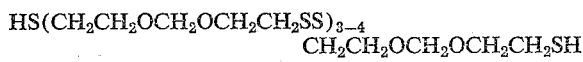
HS(CH₂CH₂OCH₂OCH₂CH₂SS)₃₋₄
      CH₂CH₂OCH₂OCH₂CH₂SH

Side mercaptan groups also occur occasionally in the chain of repeating formal units and some chain segments are cross-linked at various points (due to the trichloropropane employed as a starting material). An average of 2.00 to 2.25 sulfur atoms are present between each polymer segment. The viscosity of Thiokol LP-8 is 250-350 cps. at 27° C.

Other liquid Thiokols of this class which can be employed and their properties are as follows:

| Compound | Percent Cross-Linking | Molecular Weight | Viscosity (cps. at 25°C.) |
|---|---|---|---|
| LP-2 | | 4,000 | 35,000-40,000 |
| LP-3 | 2 | 1,000 | 700-1,200 |
| LP-33 | 0.5 | 1,000 | 1,300-1,550 |

The basic formula of Thiokol LP-3 is

HS(CH₂CH₂OCH₂OCH₂CH₂SS)₆
      CH₂CH₂OCH₂OCH₂CH₂SH

A high molecular weight liquid Thiokol which can be used is Thiokol LP-31 having the basic structure

HS(C₂H₄OCH₂OC₂H₄SS)₄₂—C₂H₄OCH₂OC₂H₄SH

A small amount of cross-linking agent, i.e., the residue from trichloropropane is also present in these Thiokols, as well as Thiokol LP-8. The liquid Thiokols are the preferred nontin containing sulfur compound used as synergists.

The second class of synergistic nontin containing sulfur compounds have the formula

HSCH₂(CH₂)ₓCOO(CRR')ₙOOCCH₂(CH₂)ₓSH where n is an integer from 2 to 8 inclusive, x is an integer from 1 to 3, and R and R' are H or alkyl, and

HSCH₂(CH₂)ₓCOO(CH₂CH₂X)ₘ
      CH₂CH₂OOCCH₂(CH₂)ₓSH where m is an integer from 1 to 8 inclusive, x is an integer from 1 to 3 and X is O or S. The materials in this second class of synergistic nontin containing sulfur compounds can be prepared by heating one mol of the appropriate alkanediol or polyethylene glycol, thiodiglycol or the like with two mols of 3-mercaptopropionic acid or the like and removing the water formed by distillation.

Typical examples of compounds within this second class of synergists are ethylene glycol bis-3-mercaptopropionate, tetramethylene glycol bis-3-mercaptopropionate, octylene glycol bis-3-mercaptopropionate, diethylene glycol bis-3-mercaptopropionate, tetraethylene glycol bis-3-mercaptopropionate, octaethylene glycol bis-3-mercaptopropionate, ethylene glycol bis-2-mercaptoacetate, octylene glycol bis-2-mercaptoacetate, ethylene glycol bis-4-mercaptobutyrate, diethylene glycol bis-2-mercaptoacetate, diethylene glycol bis-4-mercaptobutyrate, triethylene glycol bis-2-mercaptoacetate, triethylene glycol bis-3-mercaptopropionate, octaethylene glycol bis-4-mercaptobutyrate, propylene glycol bis-3-mercaptopropionate, 1,2-butylene glycol bis-3-mercaptopropionate, pinacol bis-3-mercaptopropionate, hexylene glycol bis-3-mercaptopropionate, neopentyl glycol bis-3-mercaptopropionate, and thiodiglycol bis-3-mercaptopropionate.

The nontin containing sulfur compounds of the present invention not only act as synergists in increasing the heat and light stability of halogen containing resins, more specifically vinyl halide resins, but they also improve the lubrication properties of the resins for calendering and extrusion purposes.

*Example 1*

A resin composition was prepared by mixing 100 parts of vinyl chloride homopolymer, 0.5 part of dibutyl tin maleate, 0.5 part of Thiokol LP-8, 50 parts dioctyl phthalate and 0.5 part of mineral oil together and milling to a 40 mil film at 300° F. Accelerated aging tests conducted at 355° F. indicated improved heat stability due to the inclusion of the Thiokol LP-8. Light stability tests also showed similar improvement.

*Example 2*

| | Parts |
|---|---|
| Geon 103EP (vinyl chloride homopolymer) | 100 |
| Dibutyl tin dilaurate | 1 |
| Tricresyl phosphate | 35 |
| Thiokol LP-3 | 1 |
| Mineral oil | 0.25 |

*Example 3*

| | |
|---|---|
| Polyvinyl chloride | 100 |
| Dibutyl tin S,S' bis isooctylmercaptoacetate | 1 |
| Thiokol LP-8 | 1 |

*Example 4*

| | |
|---|---|
| Geon 103EP | 100 |
| Dioctyl phthalate | 50 |
| Dibutyl tin oxide | 0.37 |
| Thiokol LP-8 | 1 |

*Example 5*

| | |
|---|---|
| Vinylite VYNW (copolymer of 96 parts vinyl chloride–4 parts vinyl acetate) | 100 |
| Dioctyl phthalate | 45 |
| Epoxidized soya oil | 5 |
| Dioctyl tin bis mercaptopropionate | 0.5 |
| Thiokol LP-8 | 0.5 |

*Example 6*

| | |
|---|---|
| Vinylite QYNA (vinyl chloride homopolymer) | 100 |
| Dioctyl phthalate | 40 |
| Stearic acid | 0.5 |
| Dibutyl tin dilaurate | 2.0 |
| Ethylene glycol bis-3-mercaptopropionate | 0.3 |

*Example 7*

| | |
|---|---|
| Geon 103EP | 100 |
| Dioctyl phthalate | 50 |
| Dibutyl tin bis mercapto-2-ethylhexanol | 1 |
| Diethylene glycol bis-3-mercaptopropionate | 0.2 |

*Example 8*

| | |
|---|---|
| Geon 103EP | 100 |
| Dioctyl phthalate | 50 |
| Dibutyl tin sulfide | 0.5 |
| Thiokol LP-8 | 0.3 |

*Example 9*

| | |
|---|---|
| Geon 103EP | 100 |
| Dioctyl phthalate | 50 |
| Ethylene glycol bis-2-mercaptoacetate | 0.5 |
| Dibutyl tin oxide | 0.5 |

Accelerated aging tests conducted at 355° F. with the compositions of Examples 2-9, inclusive, indicated improved heat stability due to the inclusion of the sulfur compound in addition to the organotin stabilizer. There was similarly an improvement in light stability.

The following table shows the effect of using Thiokol

LP-8 with dibutyl tin bis monobutyl maleate as the tin stabilizer for vinyl chloride resins. In each case there was used 100 parts of resin, 50 parts of plasticizer, 1.8 parts of dibutyl tin bis monobutyl maleate and the indicated amount of Thiokol LP-8.

| Resin | Plasticizer | Thiokol LP-8, parts | Heat Stability at 355° F. (minutes) |
|---|---|---|---|
| Geon 103EP | Dioctyl phthalate | 0 | 45 |
| Geon 103EP | ----do---- | 0.25 | 75 |
| Geon 103EP | ----do---- | 1.00 | 90 |
| VYNW | ----do---- | none | 45 |
| VYNW | ----do---- | 0.25 | 60 |
| VYNW | ----do---- | 1.00 | 75 |
| Geon 103EP | Tricresyl phosphate | 0 | 30 |
| Geon 103EP | ----do---- | 0.50 | 60 |

It is clear from the table that Thiokol LP-8 definitely improves the stabilizing action of dibutyl tin bis monobutyl maleate.

We claim:
1. A composition of matter comprising a halogen containing resin selected from the group consisting of vinyl and vinylidene resins in which the halogen is attached directly to the carbon atoms in the polymer chain and a mixture of 0.01 to 10% of an organo tin stabilizer for said resin and 0.01 to 10% of a liquid polythiopolymercaptan.
2. A composition according to claim 1 wherein said sulfur compound is a liquid polydithiopolymercaptan.
3. A composition according to claim 1 wherein said resin is a vinyl chloride resin.
4. A composition according to claim 1 wherein the halogen containing resin is a vinyl chloride resin and the organo tin stabilizer is a dialkyl tin maleate.
5. A composition according to claim 4 wherein the dialkyl tin maleate is dibutyl tin maleate.
6. A composition according to claim 1 wherein the halogen containing resin is a vinyl chloride resin and the organo tin stabilizer is a dialkyl tin bis monobutyl maleate.
7. A composition according to claim 6 wherein the dialkyl tin bis monobutyl maleate is dibutyl tin bis monobutyl maleate.
8. A composition according to claim 1 wherein the halogen containing resin is a vinyl chloride resin and the organo tin stabilizer is a dialkyl tin oxide wherein there are 4 to 10 carbon atoms in each alkyl group.
9. A composition according to claim 1 wherein the halogen containing resin is a vinyl chloride resin and the organo tin stabilizer is a dialkyl tin dilaurate.
10. A composition according to claim 9 wherein the dialkyl tin dilaurate is dibutyl tin dilaurate.
11. A composition according to claim 1 wherein the halogen containing resin is a vinyl chloride resin and the organo tin stabilizer is a dialkyl tin bis alkyl ester of a mercapto alkanoic acid having 2 to 3 carbon atoms.
12. A composition according to claim 1 wherein said halogen containing resin is a vinyl chloride resin and the organo tin stabilizer is a dialkyl tin dithio alkanoic acid alkyl ester wherein the thio alkanoic acid has 2 to 4 carbon atoms.
13. A heat resistant composition containing as a major constituent a vinyl chloride resin and as a stabilizer therefor a mixture of 0.01 to 10% of an organo tin stabilizer and 0.01 to 10% of a liquid polythiopolymercaptan.
14. A composition according to claim 13 wherein said liquid polythiopolymercaptan has a molecular weight of 500 to 700 and the general formula

$$HS(CH_2CH_2OCH_2OCH_2CH_2SS)_{3-4}$$
$$CH_2CH_2OCH_2OCH_2CH_2SH$$

References Cited in the file of this patent

UNITED STATES PATENTS

| 2,466,963 | Patrick et al. | Apr. 12, 1949 |
| 2,707,178 | Wilson | Apr. 26, 1955 |
| 2,882,261 | Marks | Apr. 14, 1959 |
| 2,893,906 | Taylor | July 7, 1959 |
| 2,954,362 | Wilson | Sept. 27, 1961 |
| 3,063,963 | Wooten et al. | Nov. 13, 1962 |

FOREIGN PATENTS

| 581,276 | Canada | Aug. 11, 1959 |